United States Patent [19]

Sudan et al.

[11] 4,324,747
[45] Apr. 13, 1982

[54] PULP WASTE LIQUOR-PHENOLIC RESIN BINDER

[75] Inventors: Krishan K. Sudan, Ste-Therese; Antoine Berchem, St. Hippolyte, both of Canada

[73] Assignee: Reichhold Limited, Ontario, Canada

[21] Appl. No.: 137,501

[22] Filed: Apr. 4, 1980

[30] Foreign Application Priority Data

Feb. 20, 1979 [GB] United Kingdom ............... 13914/79

[51] Int. Cl.³ .......................... C08G 8/28; C08H 5/02; C08J 3/12; B01J 2/02
[52] U.S. Cl. ......................................... 264/13; 524/74
[58] Field of Search ....................... 260/17.5; 528/501; 264/13

[56] References Cited

U.S. PATENT DOCUMENTS

| | | | |
|---|---|---|---|
| 1,614,205 | 1/1927 | Conner | 528/1 |
| 2,144,297 | 1/1939 | Noerr et al. | 8/94.24 |
| 2,786,008 | 3/1957 | Herschler | 260/17.5 X |
| 2,976,574 | 3/1961 | Keutgen et al. | 528/483 X |
| 3,058,159 | 10/1962 | Ishizuka et al. | 264/13 |
| 3,090,700 | 5/1963 | Ball et al. | 260/17.5 X |
| 3,395,033 | 7/1968 | Remer | 260/17.5 X |
| 3,864,291 | 2/1975 | Enkvist | 260/17.5 |
| 3,935,139 | 1/1976 | Ashall | 260/17.5 |
| 3,940,352 | 2/1976 | Wennerblom et al. | 260/17.5 |
| 4,098,770 | 7/1978 | Berchem et al. | 264/13 X |

Primary Examiner—Earl A. Nielsen
Attorney, Agent, or Firm—Larson and Taylor

[57] ABSTRACT

Modified phenol-formaldehyde resins, and processes for their preparation, are described wherein board or paper pulping process waste liquor is used as the modifier. The resins may contain, based on solids contents of both resin and waste liquor, from 1:10 to 10:1 parts by weight. These resins are cheaper than conventional resins and also use the waste-liquor without any purification step.

17 Claims, No Drawings

PULP WASTE LIQUOR-PHENOLIC RESIN BINDER

BACKGROUND OF THE INVENTION (a) Field of the Invention

This invention relates to improved phenol-formaldehyde resins, and to methods of their preparation. In particular it relates to methods of incorporating into a phenol-formaldehyde resin waste materials resulting from paper making procedures, and to the modified resin thus obtained.

(b) Description of the Prior Art

Partly as a result of cost and partly as a consequence of available supplies it has long been the practice to prepare phenol-formaldehyde resins from materials which are neither pure phenol nor pure formaldehyde. In both cases materials of a technical level of purity are commonly used. But of these two, the phenol component is by far the more expensive. As a consequence many efforts have been made to replace the phenol either completely, for instance as in urea-formaldehyde and melamine-formaldehyde resins, or at least in part with another substance and thus obtain either a different resin with new uses (as is the case with the use of urea or melamine) or a resin with approximately the same properties but which is cheaper. In this context it must be understood that "replacement" does not mean the incorporation of an inert, or relatively inert, diluent for the phenol. What is sought is a replacement substance which will take part in the chemistry of both the resin-making process and, where applicable, the resin curing process. These restrictions severely limit the number of possible substances that can be considered as potential replacement substances for phenol in phenol-formaldehyde resin systems.

All paper-making processes which employ a cellulosic material feed, irrespective of whether the overall process is directed toward first quality bond paper or low quality board for packaging, include as an early step a procedure whereby the cellulosic feed, such as wood, straw or bagasse is reduced to a fibrous mass. That pulp preparation step also produces as a byproduct an aqueous complex mixture of organic materials. The water-insoluble part of this mixture is generally removed by a suitable procedure. The remainder of the mixture, comprising a complex solution in water (which is to be taken as including both emulsions and colloidal suspensions), is generally treated to remove at least some of the water and then discarded. Disposal of this material presents a very difficult pollution problem. Typically, the water is removed to provide an aqueous material containing about 50% to 55% of organic substances: that is, to a solids content of about 50% to 55%, by weight.

Regardless of whether the pulping process used is the sulphite process, the kraft process, or a thermomechanical process, even though the detailed constitution of this byproduct changes its major component is a lignin-derived material, preferably as a lignin sulphonate. It is known that lignin materials of this type are reactive toward formaldehyde, and thus various attempts have been made to use these papermills by-products in resins as a phenol replacement. In U.S. Pat. Nos. 3,185,654 (issued May 25, 1965 and assigned to West Virginia Pulp & Paper Company); 3,227,667 (issued Jan. 4, 1966 and assigned to The Borden Company); 3,597,375 (issued Aug. 3, 1971 and assigned to Georgia-Pacific Corp.); and 3,886,101 (issued May 27, 1975 and assigned to Georgia-Pacific Corp.) are described procedures whereby the lignin-containing portion of these materials may be used in phenol-formaldehyde resin systems intended for use as adhesives, for example in the manufacture of plywood and similar products.

All of these procedures, and the many others that have been described from time to time, suffer from at least one of the following disadvantages. The most common is that if a useful resin is to be obtained it is necessary to purify or isolate the lignin material from the remainder of the materials in the liquor used. The second disadvantage is that chemical modification of the lignin often is required: e.g. U.S. Pat. No. 3,886,101 describes polymerizing lignosulfonates with an aldehyde or epoxy crosslinking agent, and U.S. Pat. No. 3,658,638 describes pre-reacting the lignosulfonate with a phenol. The third disadvantage, more common in the earlier work, it that the lignin-based material is used merely as an inert extender, and is not expected or even wanted to take part in the resin chemistry: as a consequence at least some impairment of the resin properties must result from the dilution.

None of the described techniques have been found successful, insofar as none of these known processes appear to be worked on a commercial scale. But the cost of phenol is steadily rising, and the pressure on paper and board mill operators to eliminate environmental pollution is increasing rapidly. There is therefore considerable commercial stimulus toward both the replacement of phenol, and the elimination of these paper and board mill waste liquors. Indeed processes which require the isolation or purification of the lignin-material from paper and board mill wastes are self-defeating to an extent, since in isolating the lignin-material from the waste there is no decrease in the overall amount of waste that has, somehow, to be discarded. The point is that processing one pound of black liquor from a kraft process plant to remove from it the lignin-based material present still leaves one pound of a different liquid residue for disposal.

SUMMARY OF THE INVENTION

It has now been quite surprisingly found that a modified phenol-formaldehyde resin may be prepared by mixing into an already prepared phenol-formaldehyde aqueous resin system at normal ambient temperature a quantity of paper or board mill waste liquors, in a ratio of from 1:10 to 10:1, the mixing ratio being based on the solids contents of the phenol-formaldehyde resin and the waste liquor. Preferably the ratio is from approximately 10:10 to 10:3, with a range of from approximately 10:5 to 10:3 being especially preferred.

By the phrase "normal ambient temperature" is meant a temperature, such as is normally found in temperate climates, of about 70° F. or 20° C.

DESCRIPTION OF THE PREFERRED EMBODIMENTS

Thus in a first aspect this invention comprises a process for preparing a modified phenol-formaldehyde resin which comprises mixing together at ambient temperature an aqueous phenol-formaldehyde resin with paper or board mill pulping process waste liquor in a weight ratio of from 1:10 to 10:1 based upon the solids content of both the aqueous resin and the waste liquor.

Preferably the waste liquor is black liquor originating from kraft type pulping process. Preferably the ratio is from approximately 10:10 to 10:3, with a range of from approximately 10:5 to 10:3 being especially preferred.

In a second aspect this invention comprises a modified phenol-formaldehyde resin containing paper or board mill pulping process waste liquor solids, the ratio of resin solids to waste liquor solids being from 1:10 to 10:1. Preferably the waste liquor is black liquor originating from a kraft type pulping process. Preferably the ratio is from approximately 10:10 to 10:3, with a range of from approximately 10:5 to 10:3 being especially preferred.

In the practice of this invention it is important that the mixing not involve heating. If the mixing step or indeed the mixture is exposed to heat, then crosslinking and curing between the various components in the mixture occurs. But the modified resins have been found to have an adequate shelf-life, provided that the normal precautions necessary for the storage of liquid phenol-formaldehyde resins are observed, especially temperature. Preferably this should not rise above normal temperate ambient temperatures, that is 70° F. or 20° C.

Notwithstanding this heat sensitivity it has also been discovered that these modified resins can be converted to a particulate solid by spray-drying.

Thus in a third aspect this invention provides a process for the preparation of a solid particulate modified phenol-formaldehyde resin which comprises admixing at ambient temperature an aqueous phenol-formaldehyde resin with paper or board mill pulping process waste liquor in a weight ratio of from 1:10 to 10:1 based upon the solids contents of both the aqueous resin and the waste liquor, spray-drying the thus obtained mixture, and chilling the thus obtained particulate product.

Preferably the waste liquor is black liquor originating from a kraft type pulping process. Preferably the ratio is from approximately 10:10 to 10:3, with a range of from approximately 10:5 to 10:3 being especially preferred.

In a fourth aspect this invention comprises a solid particulate modified phenol-formaldehyde resin obtained by mixing together at ambient temperature a phenol-formaldehyde resin and a paper or board mill pulping process waste liquor in a weight ratio of from 10:1 to 1:10 based on the solids contents of both the aqueous resin and the waste liquor; spray drying the mixture, and thereafter chilling the thus obtained particulate product.

The spray dried resins obtained in this fashion are freely flowing powders that are dispersible in water. Provided that they are not exposed to either excessive humidity, which can readily be avoided by using sealed containers, or heat, a maximum of 70° F. or 20° C. being desirable, then these particulate modified resins can be stored for at least several months without substantial deterioration.

The modified resins of this invention find use as adhesives, for example in the manufacture of the various sorts of boards built up from wood products, such as particle boards, wafer boards and plywoods, and also in the manufacture of composite materials from some non-wood products, for example the debris from sugar recovery from sugar cane often known as bagasse. It is to be noted that wood products involving more than one of these technologies can be used: thus these resins in their spray dried form are very useful in the preparation of composite boards comprising at least one plywood or veneer layer skin and a wafer or particle board core.

As used herein, the term "phenol" is to be taken as including not only substantially pure phenol but also commercially available technical grade phenols. Thus cresols with a high meta- and para-content in the region of about 85% by weight can also be used. The preferred technical phenol composition is one with a boiling range of 180° C. to 200° C., and containing not more than 15% by weight of ortho-cresol plus xylenols.

Similarly the term formaldehyde includes any of the generally commercially available forms of that substance, such as aqueous solutions, paraformaldehyde, etc. An aqueous solution of formaldehyde is preferred.

Insofar as the conditions of reaction and catalysts used in the preparation of the phenol-formaldehyde resin are concerned, it appears that standard conditions and procedures which will provide a resole-type resin well known in the art are used. There do not appear to be any major limitations which restrict the choice of phenol-formaldehyde resin.

In the following examples the Modulus of Rupture and Internal Bond, which are referred to as M.O.R. and I.B., were both measured by conventional methods, according to ASTM D1037. For testing the adhesive capabilities of the resins, waferboard was selected as an ideal example, since in preparing waferboards a relatively low percentage of adhesive is used as compared to either plywood or particle board. Any deficiencies in the adhesive are therefore more marked and readily apparent. Grading an adhesive for its qualities through measurements on a finished product tends to become a subjective matter; in this particular area such subjective decision can be reduced, if not eliminated, by also assessing whether or not board samples meet the Canadian Standards Association criteria.

Two particular criteria are useful in assessing the test results given below: these are the M.O.R-DRY and the M.O.R.-BOILED. For a board to be acceptable for construction purposes the M.O.R.-DRY figure required by the C.S.A. is a minimum of 2,000 psi, coupled with an M.O.R.-BOILED figure of a minimum of 1,000 psi. A board meeting these criteria can be safely used in situations where some exposure to water is to be expected and is known as suitable for external use. For internal use, for example in furniture, the M.O.R.-BOILED figure is of little relevance.

RESIN PREPARATIONS

These typical resin formulations of the resole type were used.

Resin A

Phenol and formaldehyde (44% aqueous solution) were reacted at a molar ratio of 1 mole phenol to 2 moles formaldehyde in the presence of 4% by weight of the phenol of calcium oxide as catalyst. For the first hour the temperature was held at 55° C., and then raised to 65° C. for a further two hours. The temperature was then raised to 80° C. and maintained at this until a cloud point of from 5° to 10° C. was obtained. The resin was then cooled to room temperature.

Resin B

The same procedure as for Resin A was repeated, but with the molar ratio phenol:formaldehyde raised to 1.3.

Resin C

Phenol and formadelhdye (44%) were reacted at a molar ratio of 1.0 mole phenol to 1.4 moles formaldehyde in the presence of 3% by weight of the phenol of zinc acetate as catalyst. After refluxing for three hours and cooling and separating the upper water layer a clear resin was obtained having a viscosity of 650 cps. water.

Each of these resins was blended with kraft-type process black liquor and then spray dried to provide a free-flowing powder with an average particle size of 50 microns. The spray drier used was a conventional pressure-nozzle unit; one using a centrifugal atomiser is equally satisfactory. The hot air feed to the drier was at a temperature in the range 175° C. to 200° C., and the exiting cooled air was generally at a temperature in the range of 70° C. to 100° C. The particles on leaving the hot air zone were pneumatically chilled to a temperature below 25° C. The maximum particle temperature was in the range of about 40° C. to about 50° C. Since a highly reactive system is being processed when drying these modified resins it is desirable that the dwell time of the modified resin in at least the hot zone of the drier be kept as short as is possible. A time of from 5 secs. to 40 secs. is usually sufficient, depending on the air temperatures. Using the temperatures mentioned above, a dwell time of 10 secs. to 20 secs. has been found to be adequate.

The modified resins were then used in making waferboards. Whilst the liquid resin itself can be used, for ease of both storage and handling the spray dried powder was utilized in tests.

The attached table shows the test results obtained on the waferboards made with various phenolic resin solids and black kraft liquor. The columns A and L represent results obtained with two different samples of commercially available phenolic powder BD-019 produced by Reichhold Ltd., Toronto, Canada. The columns B to K and M to U represent combinations wherein the kraft liquor solids range from approximately 9% by weight to approximately 91% by weight of the total binder solids, including the phenolic resin.

From the table, it is quite evident that kraft black liquor solids can be employed to make a waferboard or another type of composition board panel with replacement of phenolic resin over a wide range of binder compositions depending upon the degree of waterproofness and boil resistance that is required. Thus a board satisfactory for internal use can be made using only about 9% of phenolic resin in the binder. In each of these experiments the wafer boards were prepared using 3% by weight of adhesive and 2% of slack wax as sizing agent, both based on the weight of the wafers.

Since urea formaldehyde bonded particleboard employs over 10 percent binder, it has been demonstrated that a water resistant particleboard can be produced using the product of this invention. Urea formaldehyde bonded board is known to liberate formaldehyde odour during and after the board is made. The particleboard made from the product of this invention liberates no formaldehyde odour during the board manufacturing process or from the finished board product.

In the attached Table the various reported properties were measured using standard ASTM procedures.

| AVERAGE TEST RESULTS OF PHENOLIC RESIN AND BLACK LIQUOR MODIFIED RESIN BONDED WAFERBOARD PANELS | | | | | | |
|---|---|---|---|---|---|---|
| | A* | B | C | D | E | F |
| PHENOLIC/BLACK LIQUOR RATIO (weight solids) | BD-019 Phenol. Powder | 1:1 | 1:2 | 1:3 | 1:4 | 1:5 |
| NOMINAL BOARD THICKNESS - inches | 7/16 | 7/16 | 7/16 | 7/16 | 7/16 | 7/16 |
| CALIPER THICKNESS inches | 0.405 | 0.407 | 0.402 | 0.402 | 0.401 | 0.401 |
| TOTAL PRESS CYCLE (min.) | 6 min. | 6 min. | 6 min. | 6 min. | 6 min. | 6 min. |
| BOARD DENSITY - (lbs./cu.ft.) | 41.78 | 42.40 | 43.06 | 42.54 | 43.47 | 43.35 |
| MODULUS OF ELASTICITY - (lbs/sq.in.) | 610,400 | 662,163 | 482,402 | 503,845 | 539,490 | 523,863 |
| MODULUS OF RUPTURE - (dry) (lbs/sq.in.) | 4043 | 4358 | 3001 | 3134 | 3559 | 3453 |
| MODULUS OF RUPTURE - (boiled) (lbs/sq.in.) | 2351 | 1506 | 1136 | 1299 | 1339 | 1129 |
| INTERNAL BOND - (lbs./sq.in.) | 75 | 72 | 60 | 60 | 60 | 60 |
| WATER SOAK TEST - 24 Hours: | | | | | | |
| % SWELLING | 10.99 | 11.4 | 15.7 | 20.2 | 12.7 | 12.9 |
| % WATER ABSORPTION(w/w) | 23.7 | 27.34 | 31.9 | 28.8 | 28.9 | 29.2 |
| % LINEAR EXPANSION | 0.15 | 0.14 | 0.12 | 0.36 | 0.32 | 0.36 |
| | G | H | I | J | K | |
| PHENOLIC/BLACK LIQUOR RATIO (weight solids) | 1:6 | 1:7 | 1:8 | 1:9 | 1:10 | |
| NOMINAL BOARD THICKNESS - inches | 7/16 | 7/16 | 7/16 | 7/16 | 7/16 | |
| CALIPER THICKNESS inches | 0.404 | 0.404 | 0.402 | 0.407 | 0.405 | |
| TOTAL PRESS CYCLE (min.) | 6 min. | 6 min. | 6 min. | 6 min. | 6 min. | |
| BOARD DENSITY - (lbs./cu.ft.) | 42.90 | 41.69 | 43.17 | 41.77 | 42.63 | |
| MODULUS OF ELASTICITY - (lbs/sq.in.) | 494,124 | 422,906 | 476,562 | 420,071 | 459,259 | |
| MODULUS OF RUPTURE - (dry) (lbs/sq.in.) | 3032 | 2061 | 2360 | 1931 | 2516 | |
| MODULUS OF RUPTURE - (boiled) (lbs/sq.in.) | 984 | 612 | 488 | 238 | 128 | |
| INTERNAL BOND - (lbs./sq.in.) | 55 | 52 | 45 | 40 | 40 | |

-continued
AVERAGE TEST RESULTS OF PHENOLIC RESIN
AND BLACK LIQUOR MODIFIED RESIN BONDED WAFERBOARD PANELS

| WATER SOAK TEST - 24 Hours: | | | | | |
|---|---|---|---|---|---|
| % SWELLING | 19.3 | 17.77 | 17.30 | 32.73 | 25.15 |
| % WATER ABSORPTION(w/w) | 35.0 | 36.33 | 35.51 | 49.20 | 48.90 |
| % LINEAR EXPANSION | 0.33 | 0.32 | 0.27 | 0.35 | 0.32 |
| | L** | M | N | O | P |
| PHENOLIC/BLACK LIQUOR RATIO (weight solids) | BD-019 Phenol. Powder | 10:1 | 10:2 | 10:3 | 10:4 |
| NOMINAL BOARD THICKNESS - inches | 7/16 | 7/16 | 7/16 | 7/16 | 7/16 |
| CALIPER THICKNESS inches | 0.405 | 0.404 | 0.403 | 0.405 | 0.403 |
| TOTAL PRESS CYCLE (min.) | 5 min. | 5 min. | 5 min. | 5 min. | 5 min. |
| BOARD DENSITY - (lbs./cu.ft.) | 41.78 | 42.84 | 42.06 | 41.56 | 41.80 |
| MODULUS OF ELASTICITY - (lbs/sq.in.) | 534,888 | 448,996 | 474,007 | 481,678 | 503,922 |
| MODULUS OF RUPTURE - (dry) (lbs/sq.in.) | 4043 | 3420 | 3307 | 3358 | 3777 |
| MODULUS OF RUPTURE - (boiled) (lbs/sq.in.) | 2351 | 2170 | 1921 | 2413 | 2300 |
| INTERNAL BOND - (lbs./sq.in.) | 96 | 96 | 95 | 83 | 81 |
| WATER SOAK TEST - 24 hours: | | | | | |
| % SWELLING | 10.99 | 11.78 | 11.99 | 9.49 | 10.96 |
| % WATER ABSORPTION(w/w) | 23.7 | 22.78 | 23.99 | 22.37 | 23.02 |
| % LINEAR EXPANSION | 0.22 | 0.20 | 0.20 | 0.21 | 0.22 |
| | Q | R | S | T | U |
| PHENOLIC/BLACK LIQUOR RATIO (weight solids) | 10:5 | 10:6 | 10:7 | 10:8 | 10:9 |
| NOMINAL BOARD THICKNESS - inches | 7/16 | 7/16 | 7/16 | 7/16 | 7/16 |
| CALIPER THICKNESS inches | 0.397 | 0.396 | 0.398 | 0.396 | 0.397 |
| TOTAL PRESS CYCLE (min.) | 5 min. | 5 min. | 5 min. | 5 min. | 5 min. |
| BOARD DENSITY - (lbs./cu.ft.) | 43.35 | 43.25 | 42.73 | 42.44 | 42.30 |
| MODULUS OF ELASTICITY - (lbs/sq.in.) | 474,740 | 484,877 | 508,609 | 476,239 | 449,510 |
| MODULUS OF RUPTURE - (dry) (lbs/sq.in.) | 3780 | 3606 | 3489 | 3356 | 3295 |
| MODULUS OF RUPTURE - (boiled) (lbs/sq.in.) | 2407 | 2682 | 2513 | 2584 | 2195 |
| INTERNAL BOND - (lbs/sq.in.) | 81 | 74 | 72 | 73 | 72 |
| WATER SOAK TEST - 24 hours: | | | | | |
| % SWELLING | 11.98 | 10.63 | 10.70 | 13.35 | 14.72 |
| % WATER ABSORPTION(w/w) | 22.07 | 20.87 | 23.58 | 26.85 | 26.83 |
| % LINEAR EXPANSION | 0.22 | 0.23 | 0.14 | 0.14 | 0.21 |

*This resin sample is also used in Tests B-K inclusive.
**This resin sample is also used in Tests M-U inclusive.

What is claimed is:

1. A process for preparing a modified phenol-formaldehyde resin which consists essentially of admixing at ambient temperature an aqueous phenol-formaldehyde resin with paper or board mill pulping process waste block kraft liquor in a weight ratio of from 1:10 to 10:1 based upon the solids content of both the aqueous resin and the waste liquor, the mixing being effected under conditions such that there is substantially no reaction between the aqueous resin and the black kraft liquor.

2. A process according to claim 1 including the further step of converting the thus obtained modified resin into a particulate solid by spray drying the aqueous modified resin and thereafter chilling the product.

3. A process according to claims 1 or 2 wherein the weight ratio is from 10:10 to 10:3 based on the solids content of both the aqueous resin and the waste liquor.

4. A process according to claims 1 or 2 wherein the weight ratio is from 10:5 to 10:3 based on the solids content of both the aqueous resin and the waste liquor.

5. Process according to claims 1 or 2 wherein the waste liquor has a solids content of not less than 50% by weight.

6. Process according to claims 1 or 2 wherein the phenol-formaldehyde resin is prepared from a technical grade phenol.

7. Process according to claims 1 or 2 wherein the phenol-formaldehyde resin is prepared from a technical grade phenol with a meta- and para-cresol content of about 85% by weight.

8. Process according to claims 1 or 2 wherein the phenol-formaldehyde resin is prepared from a technical grade phenol having a boiling range of from 180° C. to 200° C., and containing not more than 15% by weight of orthocresol plus xylenols.

9. Process according to claim 2 wherein the spray drying step is carried out in a pressure nozzle drier, using a hot air feed at a temperature in the range of from about 175° C. to about 200° C., and wherein the resin particles are cooled pneumatically to a temperature of below about 25° C. from a maximum particle temperature of from about 40° C. to about 50° C.

10. A modified aqueous phenol-formaldehyde resin containing paper or board mill pulping process waste black kraft liquor solids, the weight ratio of aqueous resin solids to waste liquor solids being from 10:1 to 1:10, the modified resin having been obtained by mixing an aqueous phenol-formaldehyde resin and waste black kraft liquor under conditions such that there is substantially no reaction between the aqueous resin and the black kraft liquor.

11. A modified spray-dried particulate solid phenol formaldehyde particulate resin obtained by spray-drying a modified aqueous phenol-formaldehyde resin containing paper or board mill pulping process waste black kraft liquor solids, the weight ratio of aqueous resin solids to black kraft liquor solids being from 10:1 to 1:10, the modified resin having been obtained by mixing an aqueous phenol-formaldehyde resin and waste black kraft liquor under conditions such that there is substantially no reaction between the aqueous resin and the black kraft liquor.

12. A modified resin according to claims 10 or 11 wherein the weight ratio is from 10:10 to 10:3 based on the solids content of both the aqueous resin and the waste liquor.

13. A modified resin according to claims 10 or 11 wherein the weight ratio is from 10:5 to 10:3 based on the solids content of both the aqueous resin and the waste liquor.

14. A modified resin according to claims 10 or 11 wherein the waste liquor has a solids content of not less than 50% by weight.

15. A modified resin according to claims 10 or 11 wherein the phenol-formaldehyde resin is prepared from a technical grade phenol.

16. A modified resin according to claims 10 or 11 wherein the phenol-formaldehyde resin is prepared from a technical grade phenol with a meta- or para-cresol content of about 85% by weight.

17. A modified resin according to claim 11 wherein the phenol-formaldehyde resin is prepared from a technical grade phenol having a boiling range of from 180° C. to 200° C., and containing not more than 15% by weight of orthocresol plus xylenols.

* * * * *